United States Patent
Scipioni

(10) Patent No.: US 8,214,289 B2
(45) Date of Patent: Jul. 3, 2012

(54) SHORT CODES FOR BILL PAY

(75) Inventor: German Scipioni, San Jose, CA (US)

(73) Assignee: eBay Inc., San Jose, CA (US)

( * ) Notice: Subject to any disclaimer, the term of this patent is extended or adjusted under 35 U.S.C. 154(b) by 387 days.

(21) Appl. No.: 12/569,692

(22) Filed: Sep. 29, 2009

(65) Prior Publication Data

US 2011/0078076 A1    Mar. 31, 2011

(51) Int. Cl.
*G06Q 40/00* (2012.01)
(52) U.S. Cl. .............. 705/40; 705/37; 705/35
(58) Field of Classification Search ........... 705/40, 705/35
See application file for complete search history.

(56) References Cited

U.S. PATENT DOCUMENTS

| | | |
|---|---|---|
| 2006/0229998 A1 | 10/2006 | Harrison et al. |
| 2008/0254765 A1* | 10/2008 | Eliaz ............... 455/406 |
| 2011/0295746 A1* | 12/2011 | Thomas et al. ........ 705/42 |

OTHER PUBLICATIONS

Mirabella, Lorraine. "No cash? No problem: Online payment choices expand, giving shoppers more flexibility." Chicago Tribune Dec. 28, 2008, (3 pages).*

Bryan-Low, Cassell. "Wireless (A Special Report); Time is money: Mobile-phone payment-transfer programs gain favor because they can be so convenient to use." Wall Street Journal Feb. 12, 2008(3 pages).*

"MITEK Launches First Mobile Check Deposit/Bill Pay Application." Computer Workstations Feb. 1, 2008 (2 pages).*

"PayPal launches mobile payments." Electronic Payments International Apr. 1, 2006 (2 pages).*

Brown, Jeff, Bill Shipman, and Ron Vetter. "SMS: The Short Message Service" Computer. Dec. 2007. pp. 106-110 (5 pages).*

* cited by examiner

*Primary Examiner* — Elda Milef
(74) *Attorney, Agent, or Firm* — Haynes and Boone, LLP

(57) ABSTRACT

A system and method for secure transfer of a debt payment, according to one or more embodiments, provides for: receiving a request for a billing service from a biller; providing a reference code to the biller in response to the request, in which the reference code uniquely corresponds to a bill code; receiving a reply corresponding to the bill code from a customer via a network-based device in response to the bill code being included in a bill to the customer; and transferring a payment corresponding to the reference code to the biller while keeping selected financial information of the customer secure with respect to the biller.

20 Claims, 4 Drawing Sheets

SHORT CODES FOR BILL PAY

BACKGROUND

1. Technical Field

Embodiments of the present disclosure generally relate to data processing and, more particularly, to making a payment on a bill previously sent by a third party via a financial service provider using a network based device.

2. Related Art

Short codes—also known as "short numbers"—are special telephone numbers, shorter than full telephone numbers, which can also be used to address Short Message Service (SMS) and Multimedia Messaging System (MMS) messages from mobile phones or fixed phones. Short codes are intended to be shorter to read and easier to remember than normal telephone numbers. While similar to telephone numbers, short codes are generally unique to each operator, with some operators having agreements to avoid overlaps. In some countries—such as the United States—some classes of numbers are inter-operator numbers (called "common short codes" in the United States).

Short codes are widely used for value-added services such as television voting, ordering ringtones, charity donations, and mobile services. Messages sent to a short code can be billed at a higher rate than a standard SMS message and may, for example, subscribe a customer to a recurring monthly service that is added to the customer's mobile phone bill until a text message terminating the service is sent. In another example, short codes may be used to facilitate purchases from merchants using a mobile phone. Short codes are often associated with automated services. An automated program can handle a customer response and typically requires the customer to start the message with a command word or prefix. The service then responds to the command appropriately. For example, in ads or in other printed material where a provider informs about both a prefix and a short code number, the information may typically follow a long format—e.g., Text football to 72404 for latest football news—or a short format—e.g., football@72404.

SUMMARY

According to one embodiment, a system includes: a server computing device configured to communicate with a network-based device via a network; and a bill code, in which the bill code corresponds to a bill owed to a biller; and the server computing device is configured to receive a reply corresponding to the bill code from the network based device; the server computing device is configured to identify the corresponding bill owed to the biller in response to receiving the reply corresponding to the bill code from the network based device; and the server computing device is configured to transfer to the biller a payment corresponding to the bill in response to receiving the reply corresponding to the bill code from the network based device.

According to another embodiment, a method for facilitating bill payment includes: receiving a reply corresponding to a bill code by a financial service provider (FSP), for which the bill code is included in a bill viewable by a customer; and transferring to a biller a payment corresponding to the bill in response to receiving the reply corresponding to the bill code from a network based device.

According to another embodiment, a method for secure transfer of debt payment includes: receiving a request for a billing service from a biller; providing a reference code to the biller in response to the request, in which the reference code uniquely corresponds to a bill code; receiving a reply corresponding to the bill code from a customer via a network-based device in response to the bill code being included in a bill to the customer; and transferring a payment corresponding to the reference code to the biller while keeping selected financial information of the customer secure with respect to the biller.

These and other features and advantages of the present invention will be more readily apparent from the detailed description of the embodiments set forth below taken in conjunction with the accompanying drawings.

Figure 1:
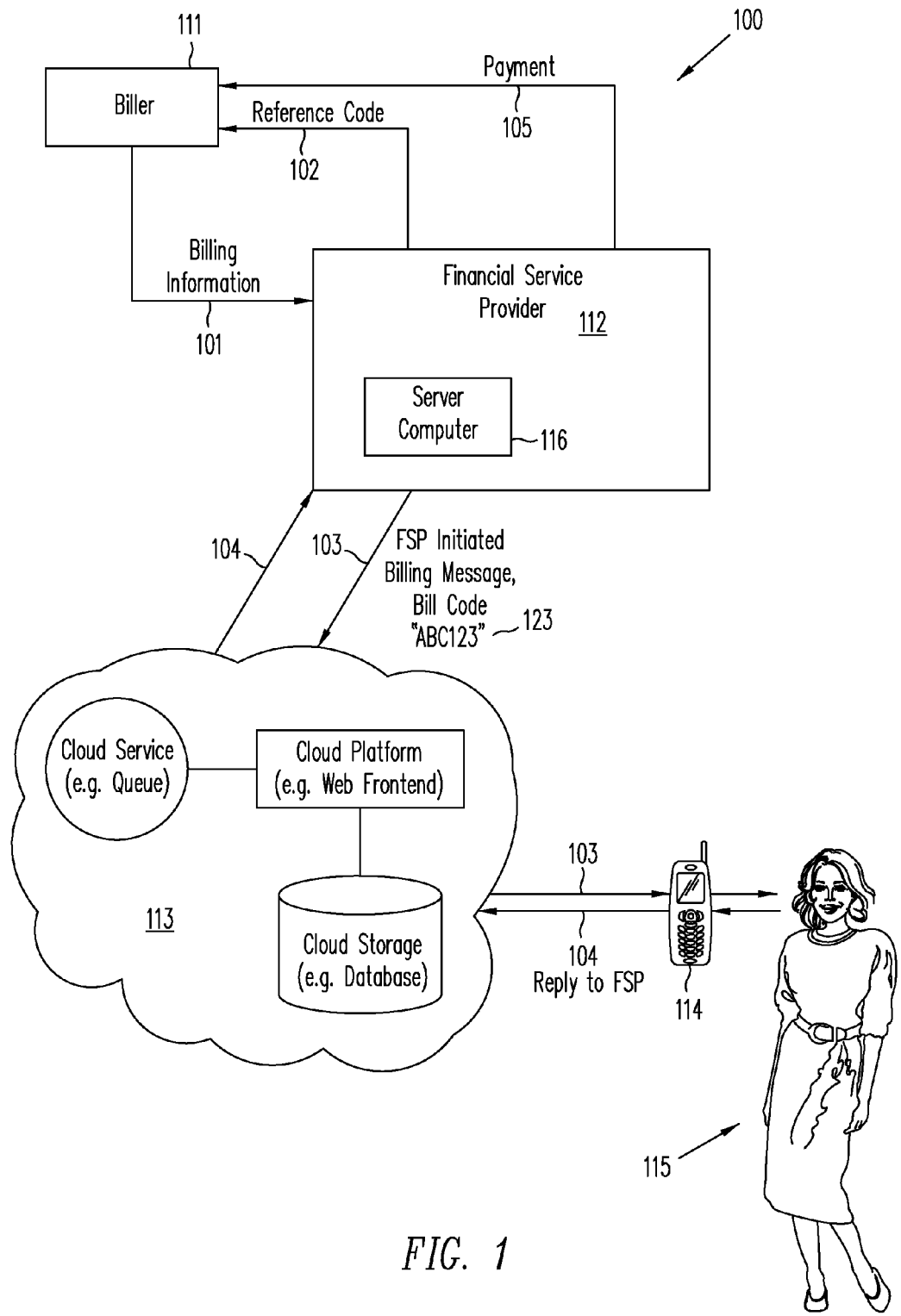
FIG. 1 is an information flow diagram illustrating a system in accordance with an embodiment of the present invention.

Some examples of embodiments and their advantages are best understood by referring to the detailed description that follows. It should be appreciated that like reference numerals are used to identify like elements illustrated in one or more of the figures, wherein showings therein are for purposes of illustrating various examples of embodiments and not for purposes of limiting the same.

DETAILED DESCRIPTION

Embodiments of the present disclosure generally relate to payment of bills—e.g., a customer's electric, gas, and water utility bills—through a financial service provider (FSP) using a text messaging capability of the customer's mobile phone. Such a bill payment service, in accordance with an embodiment, provided by the financial service provider could be useful to the customer, i.e., a user of the payment service, because for some users, it is easier to pay the bill with their phone when they open the mail than to wait and pay later. For a biller—e.g., a utility such as the electric company or some other creditor—the biller may receive payment faster, in accordance with an embodiment, than through normal bill pay, when the customer is thus encouraged by the convenience of the service to make payments sooner.

Another feature that may provide usefulness to the customer is an option, in accordance with an embodiment, that allows the customer to "pay-in-the-future", e.g., by approving a payment that will occur at a date in the future of the approval date. So, for example, a customer could receive a bill and approve the payment immediately (e.g., before forgetting about it) but not have the payment debited against the customer's account—e.g., bank, credit card, or financial service provider account—until a specified date in the future. Another feature that may provide usefulness to the biller is an option, in accordance with an embodiment, that allows the customer to "pay-now-and-save", e.g., by providing the customer a discount from the biller in return for a prompt payment or a specified discount for payment by a specified date.

Still another feature that may be useful to both a biller and customer is to use the bill payment service provided by the financial service provider as "bill-is-almost-past-due" or a "bill-is-due-pay-now-to-avoid-late-fee" service, in which the financial service provider would call the customer to provide a reminder prompt that allows the customer to pay immediately using the cell phone and avoid having overdue payments. An advantage of this feature to the biller may be that the biller can use the financial service provider for special cases and not have to use the financial service provider as the primary way, but a supplemental way for obtaining bill payment. The financial service provider may also allow users to default to this payment option, e.g., authorize the option to occur automatically. The user, for example, may be saved having to remember to log in to the biller website to pay a bill the user obviously already forgot to pay.

Yet another possible configuration is for the "biller" to be a ward or dependent of the "customer" by which the "customer" provides an allowance or funding for the "biller". For example, the "biller" may be a college student child of the "customer" having a "student account" with the financial service provider that allows the parent to provide (or not, or specify an amount) funds to the child in response to requests from the child.

Generally, embodiments provide a text messaging payment service that allows a customer (also referred to as a user) having an account with a financial service provider to text a billing code to a phone number (or short code) established by the third party biller for services provided—e.g., utility service—in order to trigger a transaction in which payment is made to the biller by the financial service provider on behalf of the user and the biller receives payment—for example, the biller credits the user's account with the biller, also referred to as a "billing account". A customer's utility bill may include the billing code and short code whether the bill, for example, is included in a paper statement received in the mail, is an on-line bill viewed by the customer at a biller's website, or is a bill viewed at a wireless application protocol (WAP) website that is specially designed for small cell-phone screens. The process of completing the transaction may include various details; for example, the financial service provider may call or text back to the user to confirm the payment, requiring confirmation, e.g., in the form of entry of a personal identification number (PIN), before making the payment to the biller.

More particularly, embodiments relate to systems and methods to receive a request associated with a third party at a financial service provider from a network-based device via a network. The network-based device—e.g., a mobile phone—is associated with a user. A payment transfer module of the financial service provider, responsive to receiving the request, transfers a payment from the user to the third party via the financial service provider.

Referring to FIG. 1, a text messaging payment system 100 is illustrated in accordance with an embodiment. System 100 may include a biller 111, a financial service provider 112, a communications network 113, and a mobile phone 114 or other network based device by which system user 115 (also referred to as "customer") may communicate with the system 100. As seen in FIG. 1, system 100 operates by providing various flows of information or data 101, 102, 103, 104, and 105, which may be provided, for example, by the use of various devices such as computers, web servers, routers, and cell phone networks—used by the biller 111 and financial service provider 112—and mobile phone 114—used by the customer 115.

For example, communications network 113 may include the Internet, email, a public or private telephone network, a private wireless network using technologies such as Bluetooth or IEEE 802.11x, or other networks, and may provide a capability for cloud computing, as indicated in FIG. 1.

Although not shown in FIG. 1, biller 111 may communicate with financial service provider 112 via communications network 113, and any of biller 111, financial service provider 112, and user 115 via mobile phone 114 may avail themselves of the cloud computing capabilities of communications network 113. In addition, financial service provider 112 may employ a server computing device 116 in the sending, receiving, and transforming of information, e.g., in the flows of information 101, 102, 103, 104, and 105.

Communication among biller 111, financial service provider 112, and customer 115 may involve, for example, web servers, web clients, browsers, and application programming interfaces (API) and may also make use of short messaging service (SMS) messaging and multimedia messaging service (MMS) messaging. The network-based device, e.g., mobile phone 114, may host an interface associated with the financial service provider 112. The network-based device—for example, mobile phone 114, a personal digital assistant (PDA), or iPhone®—used by customer 115 may be browser-enabled and may engage in an interactive message or open communication session, such as SMS, email, wireless application protocol (WAP), web, interactive voice response (IVR), or other mobile interfaces. The interactive messaging or open communication session may involve multiple technology modalities, e.g. the user (e.g., customer 115) may engage the system 100 via SMS and receive a responsive communication from an IVR Server or as an SMS with an embedded hyperlinked URL directing the user's (e.g., customer 115) device (e.g., mobile phone 114) to a WAP or web page. A hyperlinked URL may be delivered directly to the network-based device 114, for example, from an application server of the financial service provider 112 and may be used to access a web site or a micro-browser, such as a WAP site.

Biller 111 may be a creditor of customer 115 in the sense that customer 115 owes an amount of money (also referred to as the "bill amount") to the biller 111. The customer 115 may have a customer account (also referred to as the "billing account") with the biller 111, which may be identified with the biller 111, for example, by a customer account number.

For example, the biller 111 may be a utility company—e.g., electric, water, gas, or phone company—with which the customer has a billing account with an amount receivable by the biller 111. Biller 111 could also be any other type of creditor—such as a store, credit card company, or any other entity—with which the customer has a relationship of owing a debt to a creditor that can be expressed and paid as a monetary amount. In addition, the biller 111 may have some relationship to the customer 115 by which the customer 115 desires to provide funding for the biller—such as in the parent-child, student account example given above.

Figure 3:
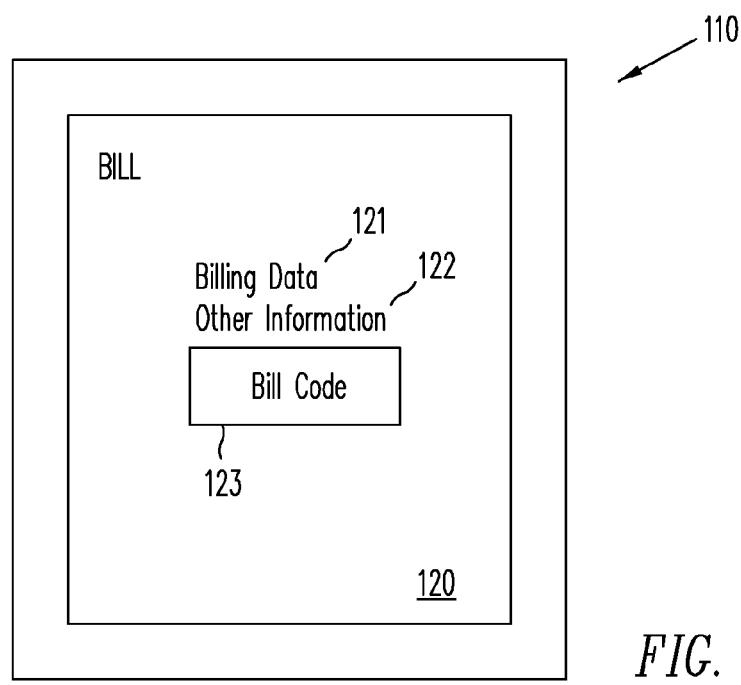
FIG. 3 is a schematic diagram illustrating a billing interface in accordance with one or more embodiments of the present invention.

The customer 115 may also have an account (also referred to as the "service account") with the financial service provider 112. The customer's service account may provide a number of payment services and functions to users, such as customer 115. The customer's service account may allow customer 115 to accumulate value (e.g., in a commercial currency, such as the U.S. dollar, or a proprietary currency, such as "points") in accounts, and then later to redeem the accumulated value against a debt (e.g., for goods, services, or other payments) presented via an invoice or bill 120, as shown in FIG. 3. The financial service provider 112 may also extend credit to customer 115, or may also have access to other funding sources to complete transactions, e.g. a credit card, a bank account, or a credit line. The financial service provider 112 may operate as a money transmitter or a bank, for example. The financial service provider 112 may keep certain specific, or selected, financial information of the customer 115 secure with respect to the third party biller 111. For example, the payment from customer 115 may be received by the biller 111 via the financial service provider 112 exclusive of the payment method or financial information of the customer 115, including credit card information, bank information, or other service account information belonging to customer 115.

Figure 2:
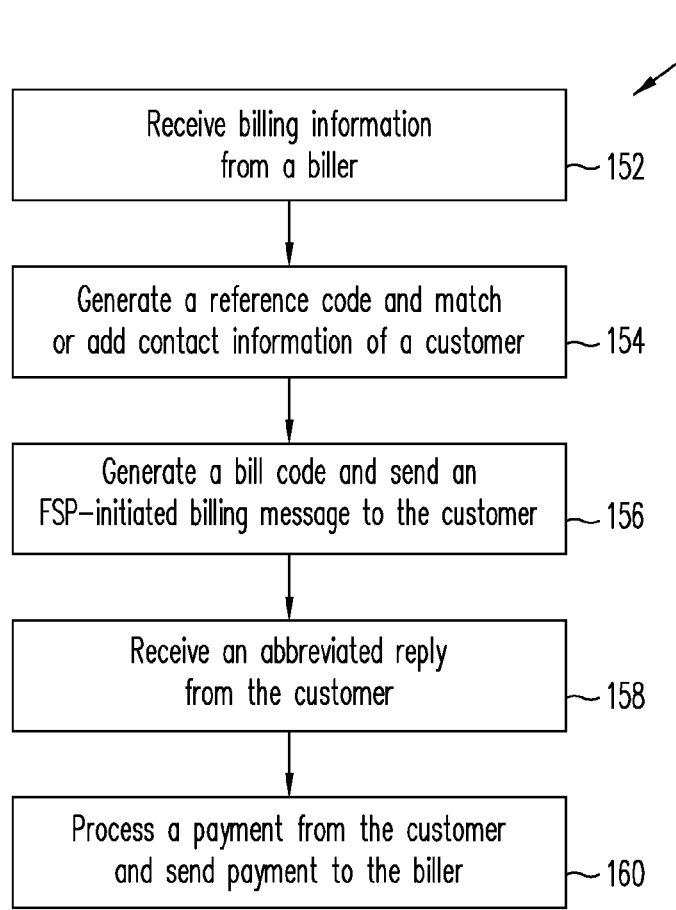
FIG. 2 is a flow chart illustrating a method in accordance with an embodiment of the present invention.

Referring now to FIG. 2, as well as to FIG. 1, a method 150, according to one embodiment, may include a step 152 in which financial service provider 112 receives billing information 101 from biller 111. Billing information 101 may, for example, accompany a request from biller 111 to financial service provider 112 to provide a bill payment service—such as "request-immediate-payment", "pay-in-the-future", "bill-is-due-pay-now-to-avoid-late-fee", or "student account payment"—or, for example, the billing information 101 may be received pursuant to a previously made arrangement between biller 111 and financial service provider 112. The billing information 101 may include, for example, payer (e.g., customer 115) name and address, payer contact information—such as phone numbers and email addresses, line items—such as particulars of a bill (e.g., bill 120 shown in FIG. 3), additional calculations—such as taxes, and a total amount of the bill. At step 154, the financial service provider 112 may generate a reference code 102.

The reference code 102 may serve, for example, as a database key that can be used to cross reference the billing information 101 received at step 152. The financial service provider 112 may send the reference code 102 to the biller 111, along with some or all of the received billing information 101 for the biller's (111) verification or validation of the reference code 102. The reference code 102 may serve, for example, as acknowledgement that financial service provider 112 has received the billing information 101 and will commence the bill payment process. The reference code 102 may also provide a common cross-reference to the billing information 101 between the biller 111 and financial service provider 112. The financial service provider 112 may also match contact information it possesses for the customer 115 with contact information provided in billing information 101 in a further process of verification for the biller 111 or may add such contact information along with the reference code 102 sent to the biller 111.

At step 156, the financial service provider 112 may generate a bill code 123 (see FIG. 1 and FIG. 3) corresponding to the reference code 102. The financial service provider 112 may generate the billing code 123 based on selected criteria, for example, the source (e.g., the biller 111) presenting the invoice or bill 120 (see FIG. 3), the type of bill (e.g., service, product, student account, or other type of payment) or the placement of the billing code 123 (e.g., whether presented to customer 115 by a traditional paper bill, by the mobile phone 114, or by an on-line bill). The financial service provider 112 may also generate the billing code 123 in such a way that it uniquely corresponds to the reference code 102. In other words, two different payment matters, with two different sets of billing information 101, do not have the same bill code 123 so that the bill code 123 by itself is sufficient to identify the particular reference code 102 and payment matter for which the bill code 123 has been generated.

Also at step 156, once the bill code 123 has been generated, the financial service provider 112 may send an FSP-initiated billing message 103, via communications network 113, to the network based device, e.g., mobile phone 114. The FSP-initiated billing message 103 may include, for example, any or all of billing information 101, the bill code 123, a short code to which the customer may send a reply via mobile phone 114, and any other data or information which may be useful to customer 115. For example, in the "bill-is-almost-past-due" or a "bill-is-due-pay-now-to-avoid-late-fee" service options, the financial service provider 112 may call the customer 115 (or send an email or SMS message to mobile phone 114) and prompt "This is [name of biller 111]; your bill is due, and you can pay using [name of financial service provider 112] right now with your bill code [bill code 123]."

In another example, the billing information 101 may include a template for a general layout with, for example, a biller logo and additional information. The financial service provider 112 may use such additional billing information 101 to receive, store, and display a digital picture of the bill (e.g., bill 120 shown in FIG. 3). For example, the financial service provider 112 may store the template information and use additional information to create a bill using any of the familiar .pdf, .gif, .bmp, or other computer file formats. For example, the biller 111, having previously provided a template and general layout, may provide some text information (e.g., name and address, contact information, line items, and total amount) and the financial service provider 112 may re-create the bill dynamically using the text information to fill in fields in the template. Thus, financial service provider 112 may provide a bill presentment service as part of any of the service options described so that, for example, a customer 115 may receive a bill, e.g., via FSP-initiated billing message 103, that like a physical bill received in the mail, the customer can have access to whenever desired and may be used, for example, as a proof, e.g., a proof of residence or a proof that home property tax was paid for refinancing purposes.

Because the FSP-initiated message 103 has been sent, e.g., initiated, by financial service provider 112, financial service provider 112 can be sure that a reply 104 to the FSP-initiated message 103 corresponds to the bill code 123 and, thus, may consider an abbreviated reply to be authentic as being from the customer 115 to whom the FSP-initiated message 103 has been addressed. An abbreviated reply may be one that, for example, does not include either the bill code 123 or a security verification such as entry of a PIN by customer 115, but rather a more simple reply that may include, for example, an indication of accord with (e.g., "Y") or rejection of (e.g., "N") paying the bill.

Thus, financial service provider 112 may not require any additional security information—such as entry of a PIN or the bill code 123 itself—in order to proceed with the process of method 150. For example, in an option where the biller 111 asks financial service provider 112 to request immediate payment, financial service provider 112 may send billing information 101 in FSP-initiated message 103, and all the customer 115 needs to do to authorize the payment to the biller 111 is to reply, for example, with a "Y" for "yes" (or whatever may be indicated in optional instructions included with FSP-initiated message 103). FSP-initiated message 103 may also, for example, provide customer 115 with an option to send in an amount different from the bill, e.g., the amount included in the billing information 101. In another example, e.g., that of the "student account", a child may send an SMS (i.e. text message, or short message service) like "get 10" to financial service provider 112; the financial service provider 112 may recognize—e.g., from the billing information 101, which may include a service account number—that the account is a "parent-child" or "student account" and may send an FSP-initiated message 103 to the phone of the parent of the account (e.g., mobile phone 114 of customer 115) including a message such as "John wants $10. Reply 'Y' or with another amount".

At step 158, financial service provider 112, e.g., via server computing device 116, may receive a reply 104 from customer 115 via a network based device, e.g., mobile phone 114. The reply 104 may be an abbreviated reply because the contact that provides the FSP-initiated message 103 and to which a reply 104 is sought is initiated by the financial service provider 112 so that the abbreviated reply 104 is sure to correspond to the bill code 123 for which the FSP-initiated message 103 has been sent. Thus, reply 104, shown in FIG. 1, may contain, for example, just the bill code 123—or an even more simple reply such as "Y" or "OK"—sent by SMS to a short code (e.g., a short code that provides a connection to the financial service provider 112) included in FSP-initiated message 103.

At step 160, financial service provider 112 may in response to receiving reply 104 process a payment 105 from (or on behalf of) customer 115 to biller 111. For example, financial service provider 112 may collect the amount of the payment 105 from the customer 115, e.g., via a credit card or bank draft payment from customer 115 to the service account of customer 115 with financial service provider 112. Financial service provider 112 may then provide a payment 105 to biller 111 using means for payment that is independent of customer 115. Thus, the biller 111 may receive the payment 105 corresponding to the billing information 101 and reference code 102, exclusive of the customer's (115) financial information, such as credit card or bank account numbers of customer 115.

Such processing and provision of payments may be accomplished automatically by machine, for example, with the aid of server computing device 116 and cloud computing provided by communications network 113. Similarly, at step 160, financial service provider 112 may receive confirmation from the biller 111 that payment 105 has been received and may provide a receipt to the customer 115.

Referring to FIG. 3, a billing interface 110 is schematically illustrated according to one embodiment. The interface 110 may include a bill 120 that may be viewable by customer 115 via one or more media, e.g. virtual or physical. The biller 111, for example, may provide the bill 120 in a paper statement (i.e., the interface 110 in this case) mailed to the customer 115. The bill 120 may, for example, be stored by the financial service provider 112 (e.g., using server computing device 116 or cloud computing capability of communications network 113) in a .pdf file (or other visual format) for the biller 111 that the customer 115 can access via a website or any other physical or virtual medium used to provide billing interface 110. Also, for example, a user interface 110 (e.g., a web page, SMS, IVR, or downloaded application) may receive the bill 120 from the biller 111 or from the financial service provider 112 in response to a query initiated by the customer 115.

In one example, as shown in FIG. 3, the bill code 123 associated with a bill 120 may be presented as part of a billing account statement. The bill 120 may describe an obligation (e.g., debt for goods, services, or other payment). The bill 120 may be associated with the bill code 123, which may be specific to a particular obligation or debt expressed by billing data 121 which may comprise billing information 101. The bill 120 may include multiple obligations with multiple respective bill codes 123. The bill 120 may also contain other information 122, such as instructions for providing reply 104, or a billing option available, such as "pay-in-the-future" and other options available.

Figure 4:
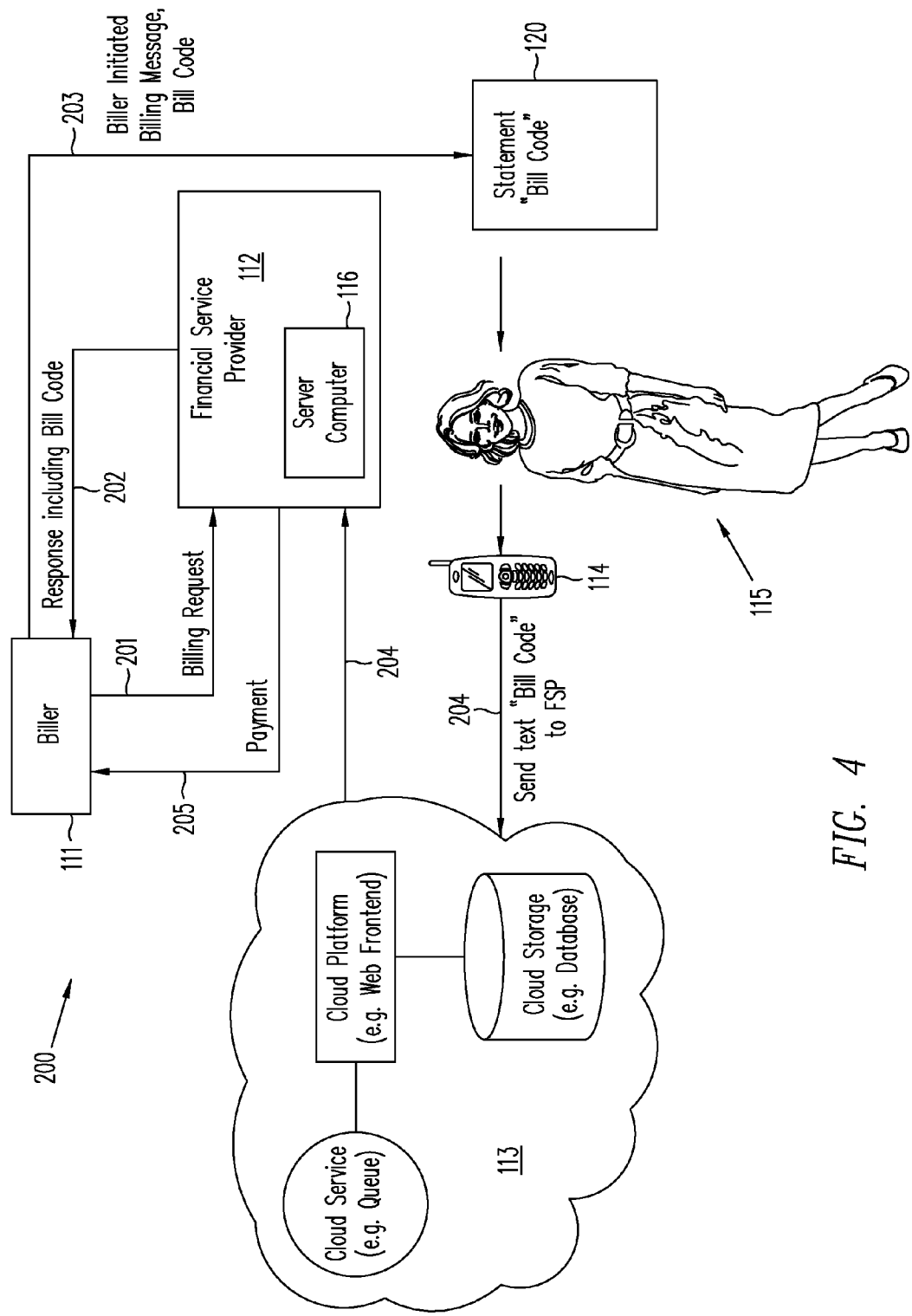
FIG. 4 is an information flow diagram illustrating a system in accordance with another embodiment of the present invention.
Figure 5:
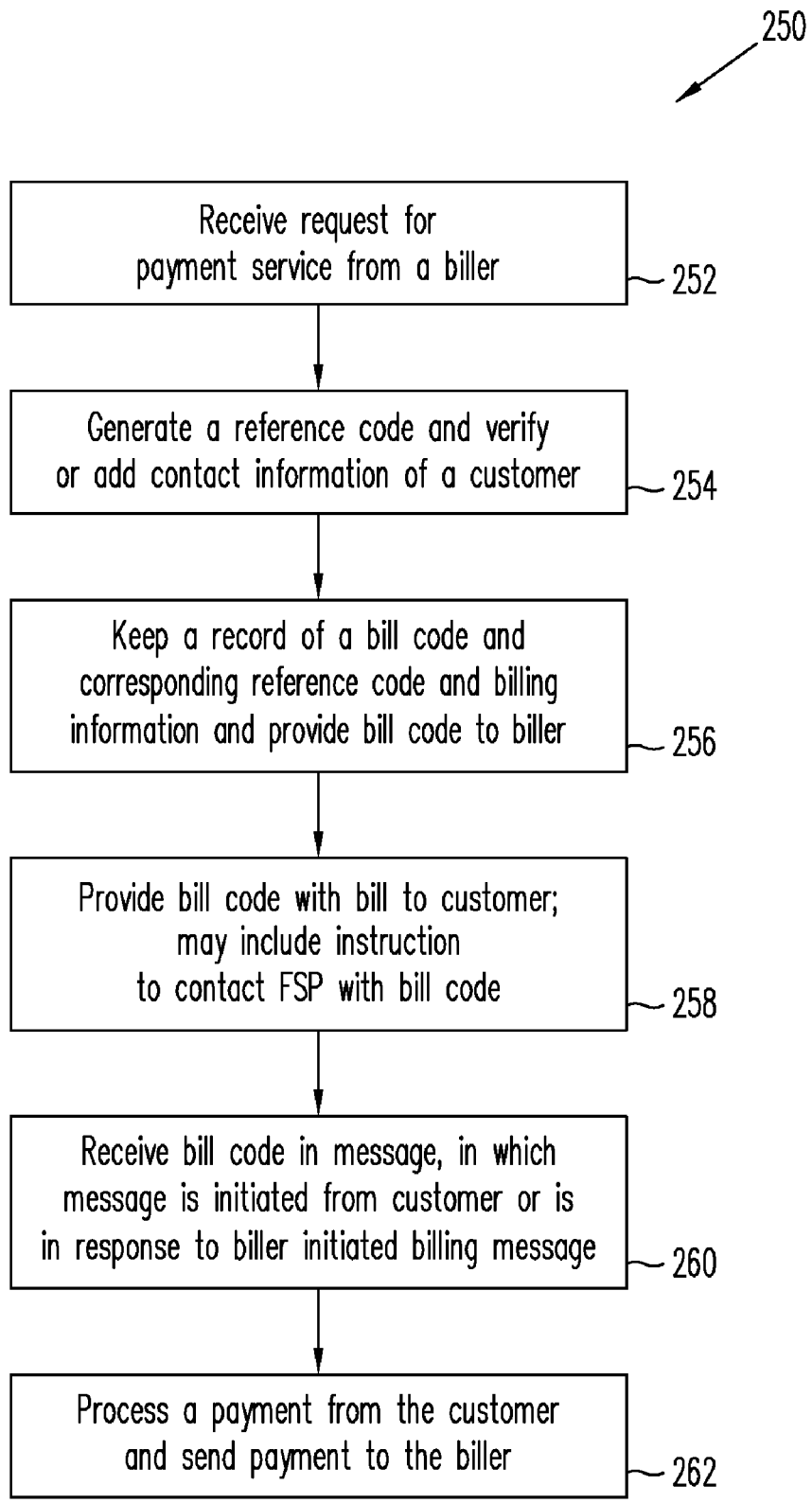
FIG. 5 is a flow chart illustrating a method in accordance with another embodiment of the present invention.

Referring to FIG. 4 and FIG. 5, a bill payment system 200 and a method 250, according to one or more embodiments, may include a step 252 in which financial service provider 112 receives a billing request 201 for a billing service from biller 111. For example, billing request 201 may include a request for a bill code 123 and other information, such as billing information 101 or contact information of the customer 115, that financial service provider 112 can use, for example, to verify that customer 115 has a service account with financial service provider 112 or to use for cross referencing to the bill code 123 that financial service provider 112 may provide to biller 111 in response to billing request 201.

At step 254, financial service provider 112 may verify from information included in billing request 201 that an arrangement for a billing service—such as "request-immediate-payment", "pay-in-the-future", "bill-is-due-pay-now-to-avoid-late-fee", or "student account payment"—has been set up between financial service provider 112 and biller 111 relevant to customer 115. For example, financial service provider 112 may verify that customer 115 has a service account with financial service provider 112 and may match or add contact information of customer 115 to any contact information provided by the biller 111 in the billing request 201.

The billing request 201 may include a bill code 123 to be "deposited" with financial service provider 112. For example, an arrangement between financial service provider 112 and biller 111 relevant to customer 115 may include a means for biller 111 to provide a unique (e.g., uniquely corresponding to the billing request 201 and its information) bill code 123 with the billing request 201. Alternatively, as in step 156, the financial service provider 112 may generate a unique (e.g., uniquely corresponding to the billing request 201 and its information) bill code 123 in response to the billing request 201. The financial service provider 112 may also, as in step 154, generate a reference code 102 that may be used, for example, as a database key to cross reference the billing request 201 and the unique bill code 123. The financial service provider 112 may generate the reference code 102 and the billing code 123 in such a way that they uniquely corresponds to each other. In other words, two different billing requests 201 representing two different payment matters, with two different sets of billing information 101, do not have the same bill code 123 so that the bill code 123 by itself is sufficient to identify the particular reference code 102 and payment matter for which the bill code 123 has been generated.

At step 256, once the bill code 123 has been generated, the financial service provider 112 may keep a record of the bill code 123 and any other information associated with the bill code 123, e.g., uniquely associated information such as the reference code 102, the billing request 201, and the associated contact information and billing information 101. The financial service provider 112, at step 256, may provide to the biller 111 a response 202 to billing request 201. The response 202 may include the bill code 123 that was either deposited with or generated in response to billing request 201. In the example that the bill code has been "deposited" with financial service provider 112, the response 202 may serve as an acknowledgement or verification that the bill code 123 has been recorded by the financial service provider 112 and is now useable by the biller 111. The response 202 may also include other information, for example, any other information associated with the bill code 123, e.g., uniquely associated information such as the reference code 102, the billing request 201, and the associated contact information and billing information 101. As with method 150, the reference code 102, e.g., when included in response 202, may provide a common cross-reference to the billing request 201 and billing information 101 between the biller 111 and financial service provider 112.

At step 258, once the response 202,—e.g., including bill code 123 or acknowledgement that the bill code 123 has been recorded by the financial service provider and is now useable—has been received by the biller 111, the biller 111 (or any other party on behalf of the biller 111) may send a biller-initiated billing message 203, including the bill code 123, in any form and by any means to the customer 115. For example, in the case of a utility like water, gas, or electricity, the utility company may send the customer 115 a traditional paper bill 120, including the bill code 123, in the mail. Other means for the biller 111 to send the bill code 123 in a biller-initiated billing message 203 may include any form of providing an interface 110 including bill code 123 to the customer 115. For example, biller 111 may send a .pdf file attached to an email as the interface 110 including a bill 120 in the .pdf document, the bill 120 including bill code 123. Interface 110 may also include, for example, a web page, or an SMS message sent to the customer's (115) mobile phone. The biller 111 may also provide a mobile application (or "app") for the customer's (115) mobile phone that allows, for example, the customer 115 to periodically check with the biller 111 for status of the customer's (115) billing account with the biller 111. The interface 110, e.g., the paper bill, may also include instructions for the customer 115, for example, to use the bill code 123 by contacting the financial service provider 112, e.g., using a short code included in the interface 110. The customer 115 may then create a text message (e.g., reply 204) with the unique bill code 123 and send the reply 204 to the short code (or phone number). Reply 204 could also be sent, for example, with an email or the user 115 may call into the IVR.

At step 260, financial service provider 112 (e.g., via server computing device 116; through SMS servers; through an email server; or via IVR) may receive a reply 204 from customer 115 via a network based device, e.g., mobile phone 114. For method 250, it may be required that the reply 204 not be an abbreviated reply; for example, the reply 204 should include a security verification such as entry of the bill code 123 or a PIN by customer 115 (or both), because the contact with the customer 115, e.g., bill 120 via interface 110, to which a reply 204 is sought is not initiated by the financial service provider 112 but, for example, by the biller 111, so that it is not certain whether the reply 204 corresponds to the bill code 123 for which the biller-initiated billing message 203 has been sent. Thus, unabbreviated reply 204, shown in FIG. 4, may contain, for example, the bill code 123 sent by SMS to a short code (e.g., a short code that provides a connection to the financial service provider 112) or a response to a security prompt in order to establish a certainty that reply 204 does indeed correspond to bill code 123, or both.

For example, the financial service provider 112 may respond to receipt of the reply 204, including bill code 123, with a prompt for the customer 115 user, e.g., "Hello, Charles [e.g., name of customer 115], this is PayPal Mobile [e.g., name of financial service provider 112] calling to confirm your bill payment to The Electric Company [e.g., name of biller 111] in the amount of $57.99 [e.g., billing information 101]. Enter your mobile PIN to confirm." In this example, the prompt may be personalized (e.g., "Hello, Charles") using information from the billing request 201, for example, by keying off of information contained in the reference code 102. Similarly, the name of the financial service provider 112 (e.g., "this is PayPal Mobile"); the name of the biller 111 (e.g., "The Electric Company"); and the billing information 101 (e.g., amount of the bill 120, "$57.99") may also be included in the prompt. The prompt may be provided, for example, by the server computing device 116. The customer 115 may also be allowed, for example, to specify some amount the customer 115 is willing to pay other than simply the amount of the bill 120 included in the billing information 101.

At step 262, financial service provider 112 may in response to receiving reply 204 process a payment 205 from customer 115 to biller 111. For example, the financial service provider 112 match the bill code 123 to the biller 111, and then notify the biller 111 the amount the customer 115 paid (which could be different from the amount of the bill 120).

The financial service provider 112 may collect the amount of the payment 205 from the customer 115, e.g., via a credit card or bank draft payment from customer 115 to the service account with financial service provider 112 of customer 115. Financial service provider 112 may then provide a payment 205 to biller 111 using means for payment that is independent of customer 115. Thus, the biller 111 may receive the payment 205 corresponding to the billing information 101 and reference code 102, exclusive of the customer's (115) financial information, such as credit card or bank account numbers of customer 115.

Such processing and provision of payments 205 may be accomplished automatically by machine, for example, with the aid of server computing device 116 and cloud computing provided by communications network 113. Similarly, at step 262, financial service provider 112 may receive confirmation from the biller 111 that payment has been received (e.g., that customer's (115) billing account with the biller 111 has been credited) and may provide a receipt to the customer 115.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as processing component (e.g., processor, micro-controller, digital signal processor (DSP), etc.), system memory component (e.g., RAM), static storage component (e.g., ROM), disk drive component (e.g., magnetic or optical), network interface component (e.g., modem or Ethernet card), display component (e.g., CRT or LCD), input component (e.g., keyboard or keypad), and cursor control component (e.g., mouse or trackball). In one embodiment, disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Logic may be encoded in a computer readable medium, which may refer to any medium that participates in providing instructions to the processor for execution. Such a medium may take many forms, including but not limited to, non-volatile media, volatile media, and transmission media. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted.

In various embodiments, execution of instruction sequences for practicing the invention may be performed by a computer system. In various other embodiments, a plurality of computer systems coupled by communication link (e.g., LAN, WLAN, PTSN, or various other wired or wireless networks) may perform instruction sequences to practice the invention in coordination with one another.

Computer system may transmit and receive messages, data, information and instructions, including one or more programs (i.e., application code) through communication link and communication interface. Received program code may be executed by processor as received or stored in disk drive component or some other non-volatile storage component for execution.

Where applicable, various embodiments provided by the present disclosure may be implemented using hardware, software, or combinations of hardware and software. Also, where applicable, the various hardware components and software components set forth herein may be combined into composite components comprising software, hardware, or both without departing from the spirit of the present disclosure. Where applicable, the various hardware components or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code or data, may be stored on one or more computer readable mediums. It is also contemplated that software identified herein may be implemented using one or more general purpose or specific purpose computers or computer systems, networked or otherwise. Where applicable, the ordering of various steps described herein may be changed, combined into composite steps, or separated into sub-steps to provide features described herein.

The foregoing disclosure is not intended to limit the present invention to the precise forms or particular fields of use disclosed. It is contemplated that various alternate embodiments or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system comprising:
   a server computing device configured to communicate with a network-based device via a network using a short code;
   a bill code, wherein:
      the bill code corresponds to a bill owed to a biller;
      the server computing device is configured to receive a reply via the short code and including the bill code from the network based device;
      the server computing device is configured to determine whether or not the reply is in response to a message initiated by a financial servicer provider (FSP) and:
         in response to the reply being to an FSP-initiated message, accept the reply as authentic; and
         in response to the reply being to a non-FSP-initiated message, require a security verification to be included in the reply;
      the server computing device is configured to identify the corresponding bill owed to the biller in response to receiving the reply corresponding to the bill code from the network based device; and
      the server computing device is configured to transfer to the biller a payment corresponding to the bill in response to receiving the reply corresponding to the bill code from the network based device.

2. The system of claim 1, wherein the bill code is generated by the server computing device.

3. The system of claim 1, wherein the bill code is generated by the server computing device in response to receiving a billing information from the biller.

4. The system of claim 1, wherein the bill code is deposited on the server by the biller.

5. The system of claim 1,
   wherein:
   the server computing device is configured to receive an abbreviated reply corresponding to the bill code for which the FSP-initiated message has been sent to the network based device.

6. The system of claim 1, wherein:
   the bill code is included in a biller-initiated message, and
   the server computing device is configured to receive an unabbreviated reply that ensures that the unabbreviated reply corresponds to the bill code for which the biller-initiated message has been sent to the network based device.

7. The system of claim 6, wherein the unabbreviated reply includes a security verification which comprises entry of a personal identification number (PIN) into the network-based device.

8. The system of claim 1, wherein the server computing device is configured to transfer to the biller the payment corresponding to the bill exclusive of payment method of a customer.

9. The system of claim 1, further comprising:
   a reference code, wherein the reference code uniquely corresponds to the bill and to the bill code.

10. The system of claim 1, wherein the payment of the bill is transferred to the biller from a service account of a customer with a financial service provider.

11. The system of claim 1, further comprising:
    an interface stored by the server computing device, wherein the bill and the billing code are viewable by a customer.

12. A method for facilitating bill payment via a communication network, the method comprising:
    receiving a reply corresponding to a bill code, wherein:
       the reply is received from a network based device via the communication network using a short code by a server processor of a financial service provider (FSP), and
       the bill code is included in a bill viewable by a customer;
    determining by the server processor whether or not the reply is in response to a message initiated by a financial servicer provider (FSP) and:
       in response to the reply being to an FSP-initiated message accepting the reply as authentic; and
       in response to the reply being to a non-FSP-initiated message, requiring a security verification to be included in the reply; and transferring to a biller a payment corresponding to the bill in response to receiving the reply corresponding to the bill code from the network based device.

13. The method of claim 12, wherein the FSP transfers the payment to the biller independently of means used by the customer to pay the FSP.

14. The method of claim 12, wherein the bill includes the short code that provides a connection to the FSP.

15. The method of claim 12, wherein the bill code is a uniquely identifiable code corresponding to the bill.

16. The method of claim 12, wherein receiving the reply corresponding to the bill code comprises receiving a reply submitted in a short message system (SMS) or multimedia message system (MMS) communication through a network-based device.

17. The method of claim 12, wherein receiving the reply comprises prompting a customer for a security verification to ensure that the reply corresponds to the bill code.

18. A method for secure transfer of debt payment using a communication network, the method comprising:
   receiving a request for a billing service from a biller;
   providing a reference code to the biller in response to the request, wherein the reference code uniquely corresponds to a bill code;
   receiving, using a short code, by a server processor a reply corresponding to the bill code from a customer via the communication network from a network-based device in response to the bill code being included in a bill to the customer;
   determining by the server processor whether or not the reply is in response to a message initiated by a financial servicer provider (FSP) and:
      in response to the reply being to an FSP-initiated message, accepting the reply as authentic; and
      in response to the reply being to a non-FSP-initiated message, requiring a security verification to be included in the reply; and
   transferring a payment corresponding to the reference code to the biller while keeping selected financial information of the customer secure with respect to the biller.

19. The method of claim 18, wherein:
the bill code is generated by a financial service provider (FSP); and
receiving the reply corresponding to the bill code comprises receiving an abbreviated reply from the customer in response to the FSP-initiated billing message.

20. The method of claim 18, wherein:
the bill code is deposited by a biller with a financial service provider (FSP);
providing a reference code to the biller in response to the request comprises an acknowledgement that the bill code has been recorded by the FSP;
the bill to the customer is included in a biller-initiated billing message; and
receiving the reply corresponding to the bill code comprises:
   prompting the customer for a security verification in response to the bill being included in the biller-initiated billing message; and
   receiving the security verification via the network-based device in response to the prompt.

* * * * *